(12) United States Patent
Mitani et al.

(10) Patent No.: US 8,977,798 B2
(45) Date of Patent: Mar. 10, 2015

(54) INTEGRATED ELECTRONIC SYSTEM MOUNTED ON AIRCRAFT

(75) Inventors: Yoichi Mitani, Kakamigahara (JP); Masahiro Tamaru, Kakamigahara (JP); Reiichi Ikarashi, Kakamigahara (JP); Taisei Isobe, Kakamigahara (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 347 days.

(21) Appl. No.: 13/514,140

(22) PCT Filed: Dec. 14, 2010

(86) PCT No.: PCT/JP2010/007253
§ 371 (c)(1),
(2), (4) Date: Jul. 23, 2012

(87) PCT Pub. No.: WO2011/074245
PCT Pub. Date: Jun. 23, 2011

(65) Prior Publication Data
US 2012/0297108 A1    Nov. 22, 2012

(30) Foreign Application Priority Data
Dec. 16, 2009  (JP) .................. 2009-284953

(51) Int. Cl.
*G06F 13/00*  (2006.01)
*B64D 47/00*  (2006.01)
*H04L 12/40*  (2006.01)

(52) U.S. Cl.
CPC .......... *B64D 47/00* (2013.01); *H04L 12/40006* (2013.01); *H04L 2012/4028* (2013.01)
USPC ............................ 710/316; 361/752; 361/753

(58) Field of Classification Search
CPC ............ G06F 13/4027; G06F 11/0739; H04B 7/18506; H04L 2012/4028
USPC ........................................................ 710/316
See application file for complete search history.

(56) References Cited

U.S. PATENT DOCUMENTS 4,422,180 A     12/1983  Wendt
5,778,203 A  *  7/1998  Birkedahl et al. ............ 710/306

(Continued)

FOREIGN PATENT DOCUMENTS

JP   B2-2-49960    10/1990
JP   A-10-109697    4/1998

(Continued)

OTHER PUBLICATIONS

Jan. 25, 2011 Search Report issued in International Patent Application No. PCT/JP2010/007253.

*Primary Examiner* — Brian Misiura
(74) *Attorney, Agent, or Firm* — Oliff PLC

(57) ABSTRACT

The present invention provides an electronic system mounted on an aircraft which can effectively reduce electronic devices and wires by integration of control systems. Specifically, a fuselage (80) of an aircraft (100) is divided into a nose part (80*a*), a center part (80*b*), and an aft part (80*c*), and two IMAs (integrated modular avionics units) (50*a* to 50*c*) are provided in each of these parts. The IMA units (50*a* to 50*c*) are interconnected via an integrated data bus (53) to construct an integrated electronic system mounted on the aircraft. The system is suitably used for integrating utility systems except for avionics systems, among a plurality of control systems mounted on the aircraft, and is also applicable to integration of the avionics systems.

6 Claims, 8 Drawing Sheets

(56) References Cited

U.S. PATENT DOCUMENTS

| | | | |
|---|---|---|---|
| 5,805,828 A * | 9/1998 | Lee et al. | 709/249 |
| 6,443,399 B1 * | 9/2002 | Yount et al. | 244/196 |
| 8,078,055 B1 * | 12/2011 | Mazuk et al. | 398/66 |
| 8,151,024 B2 * | 4/2012 | Nigoghosian et al. | 710/104 |
| 8,255,095 B2 * | 8/2012 | Girlich | 701/3 |
| 8,306,421 B1 * | 11/2012 | Mazuk et al. | 398/66 |
| 8,391,788 B1 * | 3/2013 | Mazuk et al. | 455/41.2 |
| 8,467,913 B2 * | 6/2013 | Geiter | 701/3 |
| 2003/0047997 A1 | 3/2003 | Bernier | |

FOREIGN PATENT DOCUMENTS

| | | |
|---|---|---|
| JP | A-2002-297531 | 10/2002 |
| JP | A-2008-59448 | 3/2008 |
| JP | A-2009-516275 | 4/2009 |
| WO | WO 98/13667 A1 | 4/1998 |
| WO | WO 2007/057189 A1 | 5/2007 |

\* cited by examiner

INTEGRATED ELECTRONIC SYSTEM MOUNTED ON AIRCRAFT

TECHNICAL FIELD

The present invention relates to an electronic system mounted on an aircraft and including a plurality of electronic devices to implement functions of the aircraft. Specifically, the present invention relates to an integrated electronic system mounted on an aircraft in which a plurality of functions of the aircraft are integrated.

BACKGROUND ART

Various electronic devices (avionics devices) exclusively for aircraft are incorporated into the aircraft to implement functions of gauge display, communication, navigation, flight management, etc., of the aircraft. The avionics devices are provided in respective parts of a fuselage. The avionics devices are connected to various terminal devices associated with gauge display, communication, navigation, flight management, etc., and are interconnected to construct one system (hereinafter referred to as "electronic system mounted on an aircraft"). The avionics devices are configured as LRUs (line replaceable units) so that they can be replaced promptly if a failure is found out in these avionics devices in maintenance.

In recent years, the aircraft is required to achieve weight saving of the fuselage (fuselage weight saving) to achieve higher fuel efficiency, or the fuselage or incorporated devices are required to be more simplified (configuration is more simplified) to provide maintenance of the fuselage at lower cost. However, in actuality, there is a room for improvement in achievement of the fuselage weight saving and achievement of simplified configuration.

To be specific, for the aircraft, development has been made to provide higher functions in gauge display, communication, navigation, flight management, etc. In addition to these functions, development has been made to provide another multiple functions. Because of this, electronic devices other than the avionics devices have been increasing in number, and wires connecting these electronic devices have been increasing in number. With an increase in the electronic devices and the wires, the weight of the fuselage increases, which precludes the fuselage weight saving. With an increase in the kinds of the electronic devices, simplification of the configuration is precluded, and auxiliary components of the electronic devices increase in number, which increases cost. Furthermore, with an increase in the electronic devices and the wires, a space occupied by these electronic devices and the wires increases, but a passenger space and a cargo space are narrowed, which will result in a reduced transportation efficiency.

As a solution to the above, recently, regarding the avionics devices, IMA (integrated modular avionics) units have been used in many cases. The IMA unit is configured such that plural kinds of avionics devices are integrated together. In an exemplary IMA unit, a plurality of functional modules are mounted in a single casing such that they are replaceable. In this configuration, a power supply, a CPU, an interface and the like, which are common to the avionics devices, are provided as common modules, and components unique to the functions are provided separately. This allows functions of many avionics devices to be substantially integrated into one IMA unit. As a result, the weight of the electronic system mounted on the aircraft and its occupied space can be reduced. In addition, the auxiliary components of the electronic devices can be reduced in number.

Among various aircrafts, in large-sized passenger aircrafts (hereinafter referred to as large-sized aircrafts), control systems of functions of the fuselage are integrated, separately from systems associated with gauge display, communication, navigation, flight management, etc. As such control systems, there are a landing gear system for moving up and down wheels, a fuel system for controlling a fuel, etc. In these control systems, terminal devices such as sensors, actuators, and other devices which are provided in respective parts of the fuselage, are connected to the electronic devices, to construct electronic systems mounted on the aircraft for respective functions.

For easier explanation, systems associated with gauge display, communication, navigation, flight management, etc., are referred to as "avionics system," and control systems of functions of the fuselage, which are other than the avionics systems, are referred to as "utility systems." Since the avionics systems have substantially the same functions for various fuselages, a common system of the avionics systems can be easily implemented. Therefore, avionics manufactures are developing the IMA units for the avionics systems. However, it is difficult to construct a common system of the utility systems because components in the utility systems are unique to the fuselage. Under the circumstances, LRUs have been developed for the utility systems, but integration thereof has not been developed.

To be specific, as shown in a schematic control block diagram of FIG. 7, for example, the utility systems of the aircraft include a landing gear system 61, a fuel system 62, a flame detection system 63, a breed air system 64, a de-icing system 65, and others, each of which includes terminal devices (The terminal devices will be described in detail in the description of the embodiments later). Among these systems, the landing gear system 61 is controlled by a landing gear controller 71, the fuel system 62 is controlled by a fuel controller 72, the flame detection system 63 is controlled by a flame detection controller 73, the breed air system 64 is controlled by a breed air controller 74, and the de-icing system 65 is controlled by a de-icing controller 75. The landing gear controller 71, the fuel controller 72, the flame detection controller 73, the breed air controller 74, and the de-icing controller 75 are constructed as LRUs.

As schematically shown in FIG. 8A, in a conventional aircraft 101, in the utility systems, many LRUs 70 such as the above stated controllers are mounted in a fuselage 81, and are connected to terminal devices (not shown) via many wires 60. In this configuration, the LRUs 70 and the wires 60 are laid out in an unadjusted manner according to functions of the aircraft 101.

When the IMA unit is used in the utility system, as shown in FIG. 8B, for example, in an aircraft 102, two IMA units 50 are laid out in a nose part of a fuselage 82 and many wires 60 extend from the IMA units 50 to terminal devices (not shown) provided in respective parts of the fuselage 82. This can reduce the weight of the electronic components, the space occupied by the electronic components and the number of auxiliary components, in the utility systems too. The reason why the two IMA units are provided in the nose part is to construct a double redundant system.

As can be clearly seen from comparison between FIGS. 8A and 8B, the amount of the wires 60 cannot be reduced sufficiently when the IMA units 50 are merely used. Therefore, for the large-sized aircraft, a technique is known, in which the avionics systems and the utility systems are integrated by using the IMA units and data buses are used.

In a specific example, although not shown, for example, two IMA units are laid out in the nose part, a plurality of remote data concentrators (RDCs) are provided in required locations of the fuselage, a plurality of wires extend from the RDCs to respective parts of the fuselage, and IMA units and the RDCs are connected together by means of data buses.

In this configuration, the respective IMA units are connected to the RDCs by means of the data buses, and data gathered from the respective parts of the fuselage are sent to the IMA units. In accordance with this configuration, by using the RDCs and the data buses, wires having a substantially required length are connected to the RDCs. This can reduce a physical amount of the wires and allows the data gathered from overall fuselage to be processed concentratively in the IMA units. As a result, the overall system can be simplified in configuration.

As an example of a technique which uses the IMA units and the data buses in the electronic system mounted on the aircraft, there is a technique disclosed in Patent Literature 1. This technique addresses a problem associated with ARINC 659 data buses, among data buses for avionics standardized in ARINC. As an example of a technique for integrating the avionics systems with the utility systems, there is a technique disclosed in Patent Literature 2.

CITATION LISTS

Patent Literature

Patent Literature 1: Japanese Laid-Open Patent Application Publication No. 2002-297531
Patent Literature 2: EP patent Publication No. 0928411

SUMMARY OF THE INVENTION

Technical Problem

For the large-sized aircrafts, development has been made to integrate the utility systems by using the IMA units and the data buses. However, for small-sized passenger aircrafts (airplane) (hereinafter referred to as small-sized aircrafts), such as a regional jet, development is insufficient.

As described above, in the case of the small-sized aircraft, the amount of the wires cannot be reduced sufficiently when the IMA units are merely used (see FIG. 8B). Even if an attempt is made to apply to the utility systems in the small-sized aircraft, the configuration used in the large-sized aircraft, i.e., configuration using the RDCs and the data buses, a high advantage cannot be achieved. This is because, the configuration used in the large-sized aircraft, in which the wires laid out in the respective parts of the fuselage are replaced with the RDCs and the data buses, can reduce the amount of the wires more effectively in a greater fuselage, but cannot reduce it effectively in a smaller fuselage.

In addition, in the case of the small-sized aircrafts, the existing components are frequently used as the terminal devices constituting the utility systems. Therefore, it is difficult to implement integration using the RDCs.

To be specific, the large-sized aircrafts are typically developed on a large scale. Therefore, the overall fuselage including the devices incorporated into the aircraft is developed newly in many cases. For this reason, the terminal devices can be designed according to signal specification of the RDCs used, and the RDCs can be used.

By comparison, the small-sized aircrafts such as the regional jet are typically developed on a small scale. Therefore, in some cases, the existing components are utilized, and the terminal devices in the existing aircraft are frequently utilized in the utility systems closely linked with the fuselage. In such cases, since signal specification of the existing components is frequently different from signal specification of the RDCs, they cannot be connected to the RDCs, which make it difficult to integrate the systems using the RDCs.

In general, in electronic devices (and IMA, units) for the aircraft, a transmission protocol is different between data buses (internal buses) within electronic devices and data buses (external buses) coupling electronic devices together. Because of this, it is necessary to perform data transfer processing between the external buses and the internal buses. In most cases, the processing is performed by a CPU module. In this configuration, if a CPU module corresponding to a particular electronic device (or IMA unit) fails, all of input/output signals of this electronic device (or IMA unit) cannot be used. Thus, the failure of the CPU module affects significantly, and a processing ability of the CPU module is used to perform the data transfer processing.

The present invention has been made to solve the above mentioned problem, and an object of the present invention is to provide an electronic system mounted on an aircraft which is suitably used especially in small-sized passenger aircrafts or the like, can reduce electronic devices and wires more effectively by integrating control systems, can implement integration, and can use the existing components as terminal devices in the control systems.

Solution to Problem

To solve the above mentioned problems, according to the present invention, there is provided an integrated electronic system mounted on an aircraft which integrates at least control systems of functions of a fuselage, among a plurality of control systems mounted on the aircraft, the integrated electronic system mounted on the aircraft comprising an integrated modular avionics unit; the integrated modular avionics unit including: a plurality of functional modules; a module casing for accommodating the plurality of functional modules in a mounted state; and in-casing data buses connected to the plurality of functional modules accommodated in the module casing; wherein the plurality of functional modules include a bus switch module connected to the functional modules via the in-casing data buses, respectively, to enable data transfer between the functional modules, the bus switch module being connected to an integrated data bus in the integrated electronic system mounted on the aircraft, directly or via an integrated data bus connection module, to enable data transfer between the functional modules and the integrated data bus.

In accordance with the configuration, the identical transmission protocol is preferably set for the integrated data bus which is an external bus of an IMA unit and an in-casing data bus which is an internal bus of the IMA unit. Therefore, by connecting the bus switch module to the integrated data bus, a single network can be constructed in the overall system irrespective of inside or outside of the IMA unit. Therefore, as compared to a case where a transmission protocol is different between the external bus and the internal bus and data transfer processing between them is performed by a CPU module, if a CPU module in a particular IMA unit fails, a CPU module in another IMA unit can easily access input/output signals of the particular IMA unit, and can easily perform the function of the CPU module in a failure condition. Thus, fault tolerance can be improved. In addition, this has an advantage that a processing ability of the CPU module is not used in the data transfer processing. That is, in accordance with the present invention, a technique can be provided and implemented in which in the electronic system mounted on the aircraft comprising a plurality of electronic devices including IMA units, the system is not affected significantly by occurrence of a failure in the CPU module in a particular electronic device, and fault tolerance can be improved.

To solve the above mentioned problems, according to the present invention, there is provided another integrated electronic system mounted on an aircraft which integrates at least control systems of functions of a fuselage, among a plurality of control systems mounted on the aircraft, comprising: integrated modular avionics units provided in a nose part, a center part, and an aft part of a fuselage of the aircraft; and an integrated data bus for mutually connecting the integrated modular avionics units.

In accordance with this configuration, rather than RDCs, the MIA units are provided in the nose part, the center part, and the aft part of the fuselage which are parts where control systems are crammed and are connected together via the integrated data bus. This can minimize the IMA units in number, and a greater part of wires can be replaced by the integrated data bus. Therefore, even in utility systems mounted in a small-sized aircraft, the electronic devices and the wires can be lessened significantly.

In the integrated electronic system mounted on the aircraft, as configured above, the integrated modular avionics units may be configured such that two or more integrated modular avionics units are provided in each of the nose part, the center part, and the aft part of the fuselage. This makes it possible to construct at least a double redundant system in each of the parts and improve reliability of the system.

In the integrated electronic system mounted on the aircraft, the integrated modular avionics unit in the integrated electronic system mounted on the aircraft may include a plurality of functional modules; a module casing for accommodating the plurality of functional modules in a mounted state; and in-casing data buses connected to the plurality of functional modules accommodated in the module casing; wherein the plurality of functional modules include a bus switch module connected to the functional modules via the in-casing data buses, respectively, to enable data transfer between the functional modules, the bus switch module being connected to an integrated data bus in the integrated electronic system mounted on the aircraft, directly or via an integrated data bus connection module, to enable data transfer between the functional modules and the integrated data bus.

In the integrated electronic system mounted on the aircraft as configured above, preferably, the plurality of functional modules in the integrated modular avionics unit may include: a processor module for performing processing to control the control systems; a signal conversion module for converting input/output signals input/output to/from terminal devices in the control systems into processed signals in a predetermined format; and a digital data conversion module for performing mutual conversion between the processed signals converted by the signal conversion module and digital data which can be processed by the processor module; wherein the signal conversion module is constituted by an analog circuit and is connected to the in-casing data bus in integrated modular avionics unit via the digital data conversion module.

In accordance with this configuration, since the signal conversion module standardizes input/output signals in different formats, and then the signals are processed, existing components using different signal formats may be used as terminal devices. Therefore, in the utility systems of the small-sized aircraft, integration using the existing components can be implemented. Since the signal conversion module is constituted by the analog circuit, there is no need for programs implemented for digital data processing, and therefore development cost can be reduced.

In the integrated electronic system mounted on the aircraft as configured above, the functional modules may include an aircraft communication module standardized exclusively for the aircraft. For example, when the aircraft communication module is an ARINC429 module, the avionics systems can be integrated as well as the utility systems.

The integrated electronic system mounted on the aircraft of the present invention is applicable to various kinds of aircrafts. Among them, in particular, the integrated electronic system mounted on the aircraft of the present invention is preferably applicable to a small-sized aircraft such as a regional jet.

The present invention encompasses an integration method of the electronic system mounted on the aircraft as well as the above stated integrated electronic system mounted on the aircraft. The method of integrating the electronic system mounted on the aircraft, of the present invention, comprises integrating at least control systems of functions of a fuselage, among a plurality of control systems mounted on the aircraft; and mutually connecting integrated modular avionics units provided in a nose part, a center part, and an aft part of the fuselage of the aircraft, by using an integrated data bus.

The above and further objects, features and advantages of the present invention will more fully be apparent from the following detailed description of preferred embodiments with accompanying drawings.

Industrial Applicability

As should be appreciated from the above, in accordance with the present invention, it is possible to implement an electronic system mounted on an aircraft which can more effectively reduce electronic devices and wires by integration of control systems, use existing components as terminal devices in control systems, and improve fault tolerance.

REFERENCE SIGNS LISTS

Figure 1:
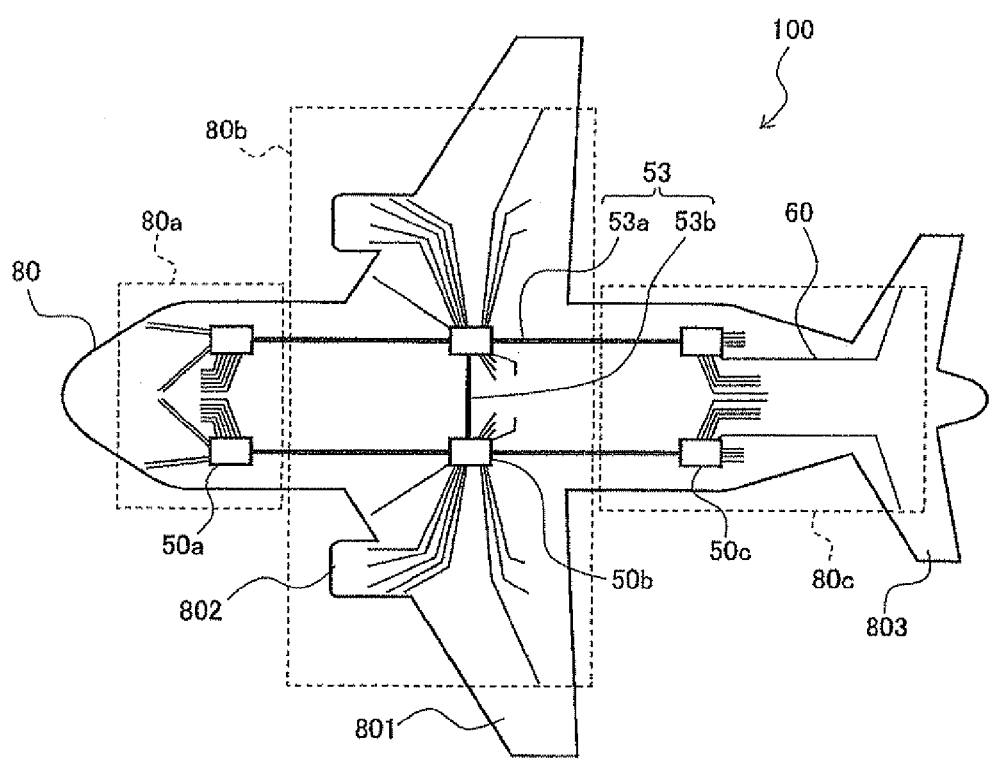
FIG. 1 is a schematic wiring diagram showing exemplary layout of integrated modular avionics units (IMA units) and wires in an integrated electronic system mounted on an aircraft according to an embodiment of the present invention.

50 IMA (integrated modular avionics) unit
50a nose part IMA unit
50b center part IMA unit
50c aft part IMA unit
50d hub IMA unit
51 module casing
53 integrated data bus
53a longitudinal integrated data bus
53b lateral integrated data bus
54 in-casing data bus
55 functional module
56 CCDL (cross channel data link)
57 in-casing signal line
60 wire
80 fuselage
80a nose part
80b center part
80c aft part
100 aircraft
150 comparative IMA (integrated modular avionics) unit
501 bus switch module
502 CPU module (processor module)
503 ARINC429 module (aircraft communication module)
504 discrete I/O module (digital data conversion module)
505 analog/digital conversion module (digital data conversion module)
506 signal conversion module
507 power supply module
1502 comparative CPU module (processor module)

DESCRIPTION OF THE EMBODIMENTS

Hereinafter, preferred embodiments of the present invention will be described with reference to the drawings. Throughout the drawings, the same or corresponding components are identified by the same reference symbols and will not be described in repetition.

[Configuration of Integrated Electronic System Mounted on Aircraft]

First of all, an overall configuration of an integrated electronic system mounted on an aircraft of the present embodiment will be specifically described with reference to FIGS. 1 and 2. In the present embodiment, for easier explanation, the "integrated electronic system mounted on the aircraft" will be referred to as "integrated electronic system."

Figure 2:
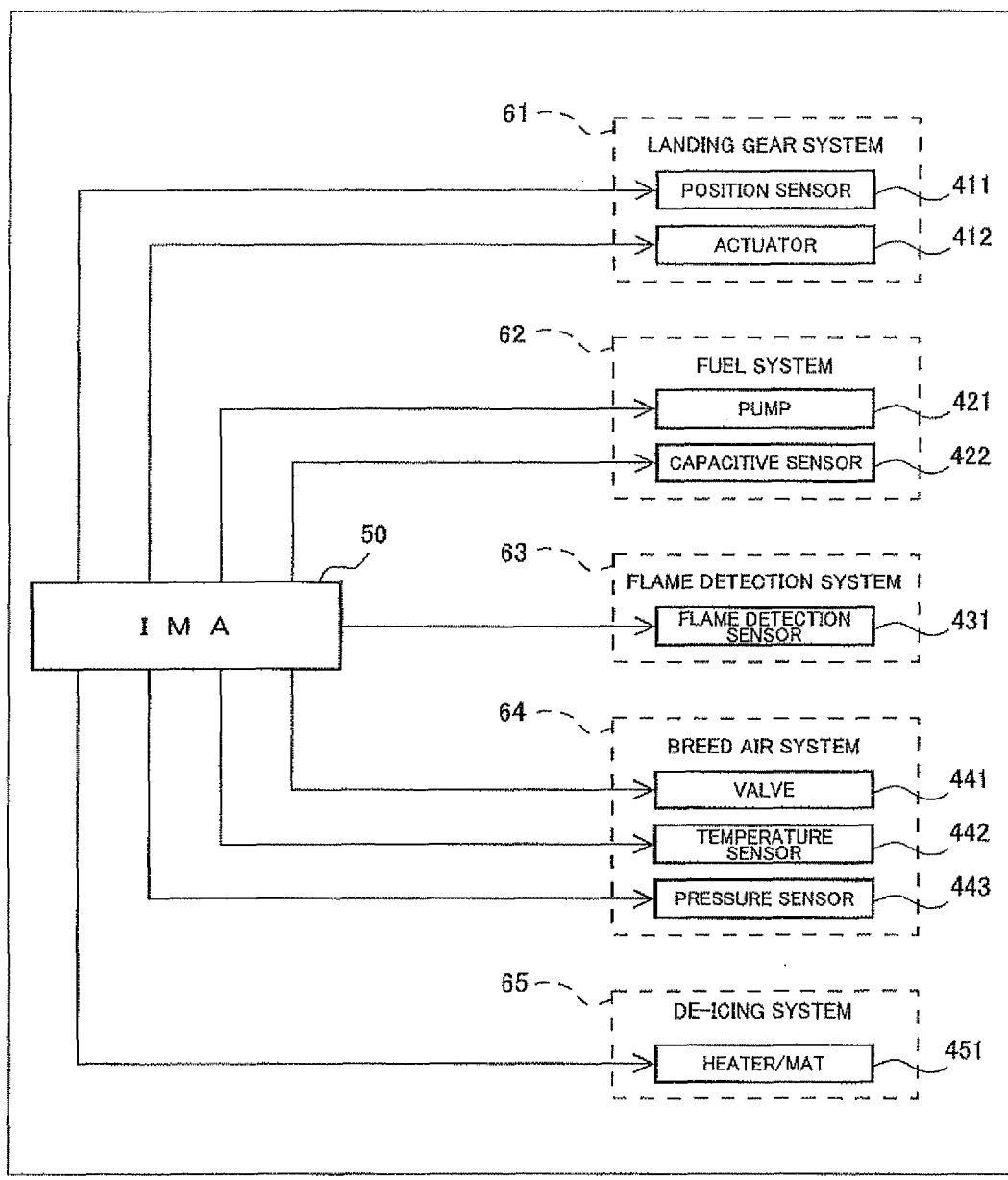
FIG. 2 is a block diagram showing a schematic configuration of the integrated electronic system mounted on the aircraft of FIG. 1.

FIG. 1 is a schematic wiring diagram showing exemplary layout of integrated modular avionics (IMA) units and wires in the integrated electronic system according to the embodiment. FIG. 2 is a block diagram showing a schematic configuration of the integrated electronic system of FIG. 1.

As shown in FIG. 1, the integrated electronic system of the present embodiment includes two IMA units 50a corresponding to a nose part 80a, two IMA units 50b corresponding to a center part 80b, and two IMA units 50c corresponding to an aft part 80c, and an integrated data bus 53 interconnecting the IMA units 50a to 50c, when a fuselage 80 of an aircraft 100 is divided into the nose part 80a, the center part 80b, and the aft part 80c.

As shown in FIG. 1, the aircraft 100 is schematically depicted as a contour of an outer shape of a general passenger aircraft or transportation aircraft. The kind of the aircraft 100 is not specifically limited. Note that in the present embodiment, the integrated electronic system is suitably used as a system which does not use terminal devices and the like developed newly, but uses the existing terminal devices and the like (existing components). Therefore, the aircraft 100 widely includes general aircraft manufactured using the existing components.

As a particularly preferable example of the aircraft 100, there is a regional jet. The regional jet is a small-sized passenger aircraft (small-sized aircraft) having 50 to 100 seats. The regional jet has advantages that it generates a less noise and a distance of a required runway is shorter, as compared to a large-sized passenger aircraft (large-sized aircraft) or a medium-sized passenger aircraft (medium-sized aircraft). Because of this, in recent years, the regional jet has drawn an attention in fields of passenger aircrafts. But, the regional jet is developed on a small scale, and therefore it is difficult to develop an overall fuselage of the regional jet newly unlike the large-sized aircraft. Therefore, the existing components of the existing aircraft are frequently utilized as the terminal devices of functions in the fuselage which are unique to the fuselage. Thus, the present invention is preferably applicable to the regional jet. Nonetheless, the present invention is not limited to the small-sized aircrafts such as the regional jet, but may be applied to medium-sized aircrafts and large-sized aircrafts. Moreover, the present invention is preferably applicable to transportation aircraft, or the like as well as passenger aircrafts.

In the present embodiment, the fuselage 80 of the aircraft 100 is divided into three parts, and the IMA units 50a to 50c are provided in these parts, respectively. The nose part 80a is provided with a cockpit, a nose landing gear, and others. The center part 80b is provided with wings 801, engines 802, main landing gears, and others. The aft part 80c is provided with stabilizing fins 803, auxiliary power units, and others. These parts may be recognized as parts where input/output signals in the control systems are gathered. Therefore, in the present embodiment, the two IMA units 50a, the two IMA units 50b and the two IMA units 50c are provided in these parts, respectively. The reason why the two IMA units 50a, the two IMA units 50b and the two IMA units 50c are provided in these parts, respectively, is to construct a double redundant system in each part.

Figure 8A:
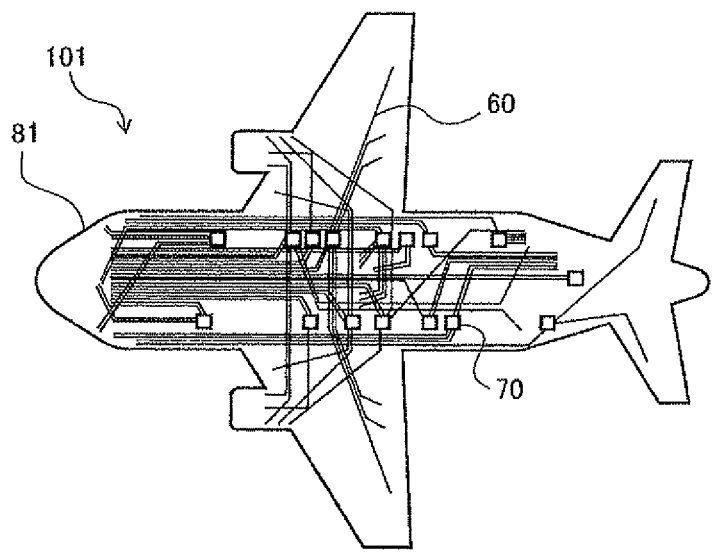
FIG. 8A is a schematic wiring diagram showing exemplary layout of LRUs and wires constituting utility systems in a conventional aircraft.
Figure 8B:
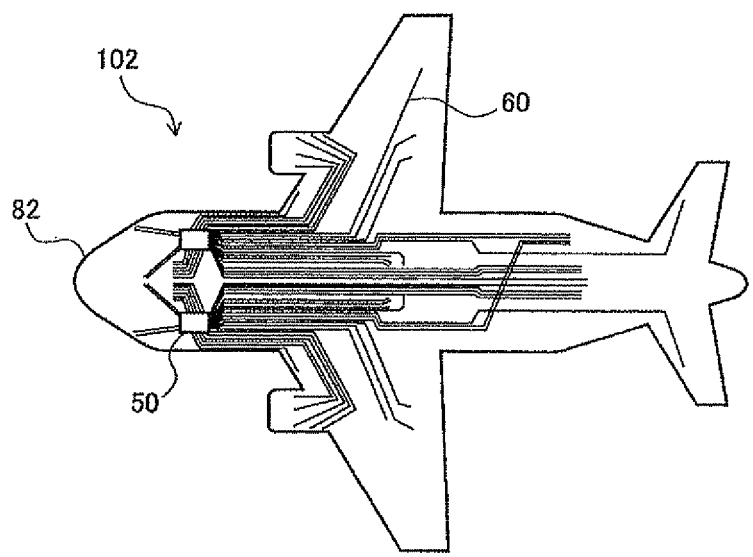
FIG. 8B is a schematic wiring diagram showing exemplary layout of IMA units and wires in a case where IMA units are used in utility systems in the conventional aircraft.

Among the above stated parts, the input/output signals are gathered particularly in the nose part 80a where the cock pit is present. If the two IMA units 50a are provided only in the nose part 80a, the overall integrated electronic system becomes a double redundant system, and therefore a physical amount (weight of wires, length of wires) of the wires 60 cannot be reduced sufficiently (FIG. 8B).

It may be possible that the two IMA units 50b or the two IMA units 50c are provided in either the center part 80b or the aft part 80c, respectively, in addition to the IMA units 50a, and the integrated electronic system is configured to include the four IMA units. As shown in FIG. 1, the wires 60 extend from the IMA units 50b provided in the center part 80b to the overall wings 801, and the wires 60 extend from the IMA units 50c provided in the aft part 80c to the stabilizing fins 803 as well as the aft part of the fuselage, Therefore, in the configuration in which the two IMA units 50b or the two IMA units 50c are provided only in either the center part 80b or the aft part 80c, respectively, the wires 60 extending to the wings 801 or the stabilizing fins 803 are very long, which cannot reduce the wires 60 sufficiently. In view of this, in the present embodiment, the two IMA units 50b and the two IMA units 50c are provided in the center part 80b and the aft part 80c, respectively, to reduce the wires 60.

The IMA units 50a to 50c have the same configuration, and its specific configuration will be described later. The IMA units 50a to 50c are interconnected via an integrated data bus 53. To be specific, as shown in FIG. 1, in a direction from forward to rearward in the fuselage 80, the IMA unit 50a, the IMA unit 50b, and the IMA unit 50c are connected together via a single longitudinal bus 53a, and longitudinal buses 53a are connected together via a lateral bus 53b in the center part 80b. Therefore, the integrated data bus 53 is entirely wire having a H-shape in which centers of the two longitudinal buses 53a are connected together via the lateral bus 53b.

A specific configuration of the integrated data bus 53 is not particularly limited, but a bus cable known in the field of aircraft may be used as the integrated data bus 53. Specification of the integrated data bus 53 is not particularly limited, but a bus (ARINC664 or the like) of ARINC (Aeronautical Radio, Inc.) specification which has been used recently in the fields of aircraft may be used, or another bus specification may be used, as the specification of the integrated data bus 53.

In FIG. 1, the longitudinal bus 53a of the integrated data bus 53 is depicted as a single bus line. In actuality, the longitudinal bus 53a is composed of a plurality of cables as described later. Although the lateral bus 53b connects the two IMA units 50b in FIG. 1, in the present embodiment, the lateral bus 53b is implemented in such a manner that IMA units (hub IMA units) are provided separately from the IMA units 50a to 50c and are connected together as described later. However, in a case where a bus switch has a high data transfer processing ability, and a single switch module is capable of data transfer between the integrated data bus and the in-casing data bus, the hub IMA units may be omitted and the switch modules of the IMA units 50a to 50e may be directly connected together. The single lateral bus 53b may be provided as shown in FIG. 1, or a plurality of lateral buses 53b may be provided. When the single lateral bus 53b is provided, its location is not particularly limited. The lateral bus 53b may be provided in the center part 80b, the nose part 80a, or the aft part 80e.

The integrated electronic system of the present embodiment is intended to primarily integrate the utility systems except for the avionics systems, among a plurality of control systems incorporated in the aircraft 100. The avionics systems have substantially the same function among various fuselages, and therefore are easily shared among them. Avionics manufactures are now developing IMA units. Therefore, the avionics systems can be integrated without applying the present invention. The present invention is required to be a system for integrating at least the utility systems and is preferably applicable to uses in which the utility systems and the avionics systems are integrated. Therefore, the integrated electronic system of the present embodiment may include the avionics systems as well as the utility systems.

A specific configuration of the utility systems integrated by the integrated electronic system of the present invention is not particularly limited. For example, as shown in FIG. 2, the utility systems include a landing gear system 61, a fuel system 62, a flame detection system 63, a breed air system 64, and a de-icing system 65. In the present invention, at least two utility systems may be integrated, among these utility systems. Preferably, three or more utility systems are integrated. More preferably, all of the utility systems are integrated. Most preferably, another systems (not shown) such as the avionics systems, are integrated. The control systems which are the two or more systems to be integrated may be selected suitably depending on the specific kind, use, configuration or the like of the aircraft 100, and are not particularly limited.

The landing gear system 61 is a control system for extending the nose landing gear and the main landing gear from the fuselage 80 and retracting the nose landing gear and the main landing gear into the fuselage 80, and includes a position sensor 411 for detecting a position of the nose landing gear or the main landing gear, an actuator 412 as a driving source for actuating the nose landing gear or the main landing gear, etc.

The fuel system 62 is a control system mounted in the aircraft 100, to control supply, management, or the like of the fuel for flight, and includes a pump 421 for supplying a fuel, a capacitive sensor 422 for detecting a fuel amount inside the tank, etc.

The flame detection system 63 includes a control system for detecting occurrence of a flame in the interior of the aircraft 100, and includes a flame detection sensor 431, etc., provided in each part of the fuselage 80.

The breed air system 64 is a control system for adjusting a temperature and a pressure of breed air (high-temperature and high-pressure air from a compressor of the engine) used as a heat source, a pressure source, a driving power source, or the like, in each of the functions in the aircraft 100 at constant values, and includes a valve 441 for breeding air from the compressor, a temperature sensor 442 for detecting a temperature of the breed air, a pressure sensor 443 for detecting a pressure of the breed air, etc.

The de-icing system 65 is a control system for removing ice (or snow) generated on the outer surface of the fuselage 80 in the aircraft 100, and includes a heater mat 451 for heating the outer surface of the fuselage 80, etc.

Although not shown, the utility systems may include a control system for controlling air-conditioning (pressurization, air ventilation, temperature adjustment, etc.) in the interior of the aircraft 100. In the case of the passenger aircraft, the utility systems may include a video and audio reproducing device provided to passengers, etc. The devices such as the sensors, the actuators, the driving source, the heater and the like constituting the control systems are terminal devices provided in the respective parts of the aircraft 100 to implement respective functions.

Figure 7:
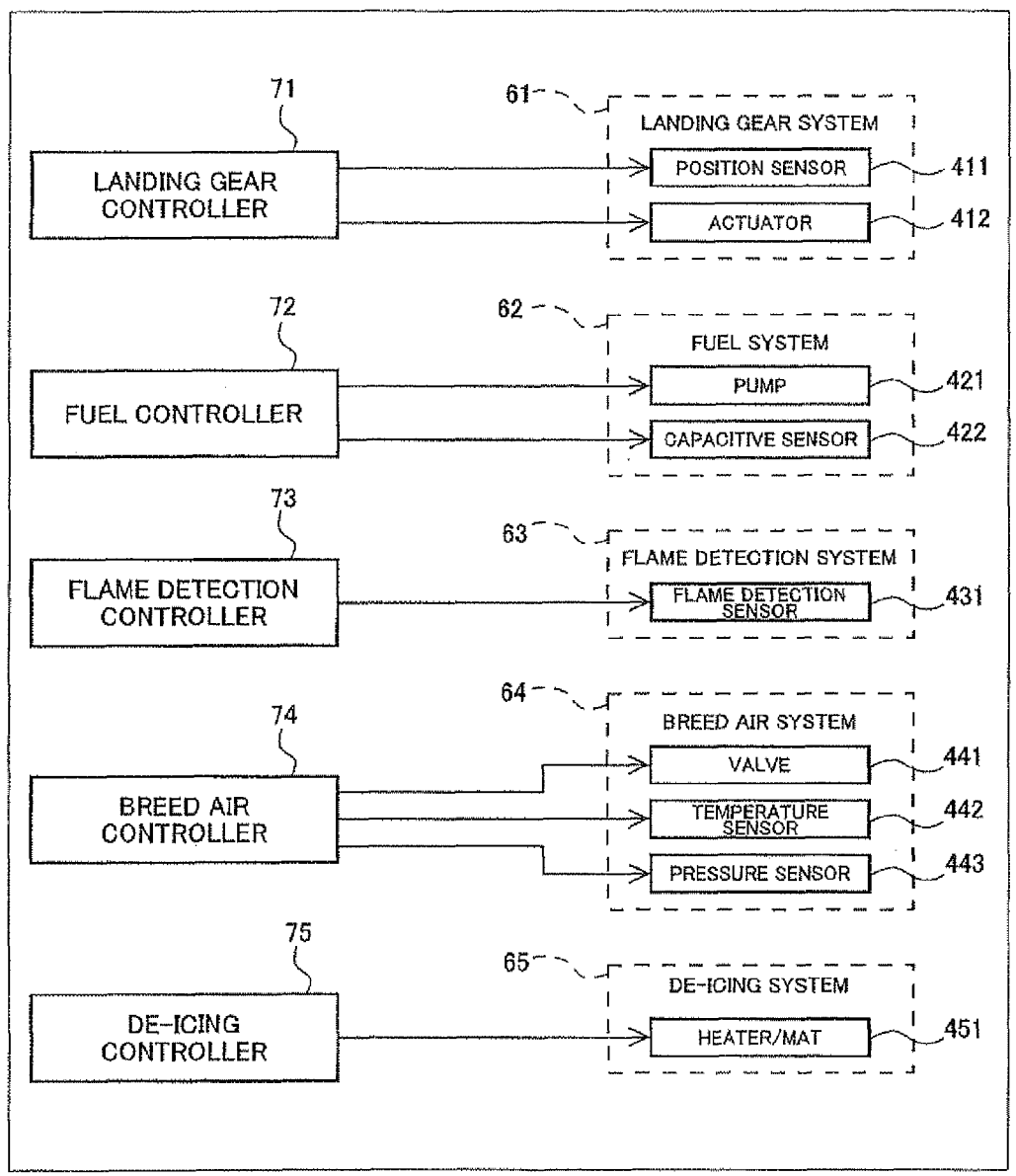
FIG. 7 is a block diagram showing a schematic configuration of utility systems in a conventional aircraft.

In a conventional technique, the control systems are individually controlled by separate controllers (see FIG. 7). In the present embodiment, integrated control is implemented by the IMA units 50. Although one block of the IMA unit 50 is illustrated in FIG. 2 for easier explanation, controls of the these control systems are allocated to six IMA units 50a to 50c in the actual configuration as shown in FIG. 1.

[Configuration of Integrated Modular Avionics (IMA) Unit]

Figure 3:
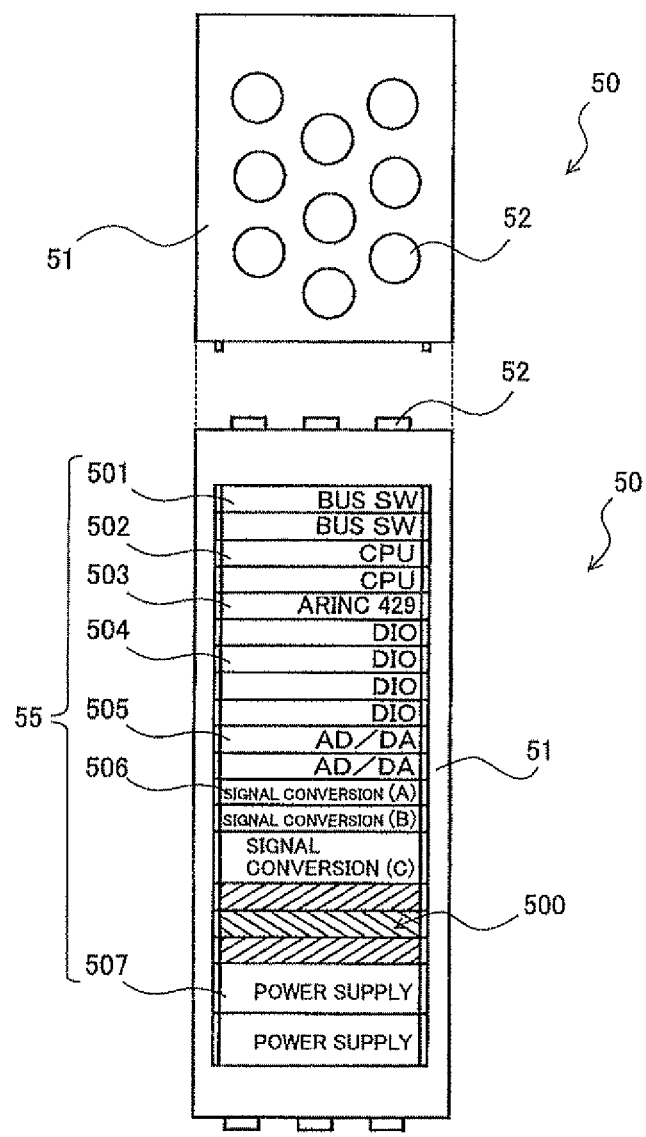
FIG. 3 is a view showing a comparison between a front view and a side view schematically showing an exemplary configuration of the IMA unit of FIG. 1.
Figure 4A:
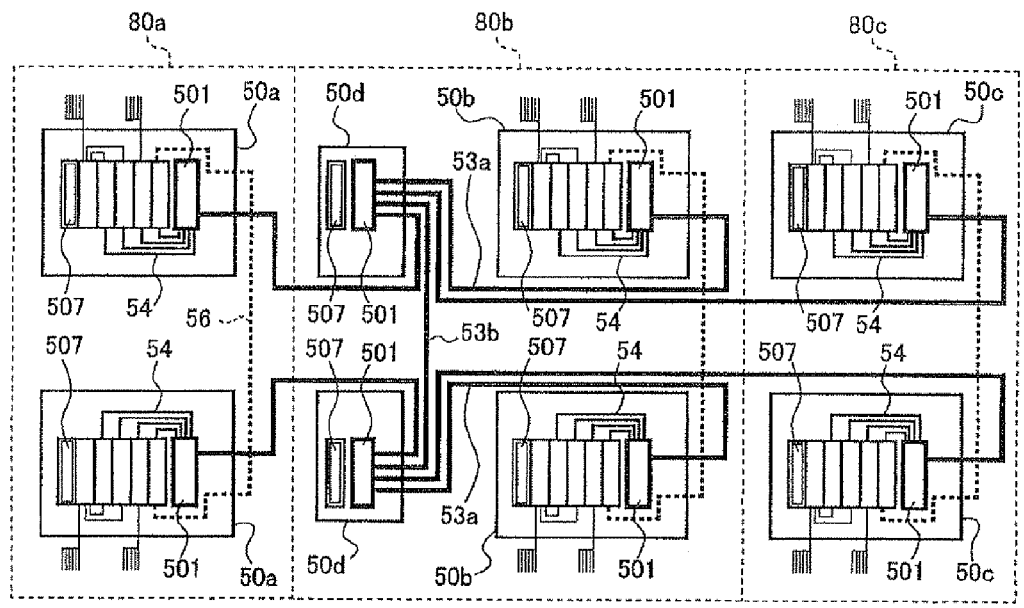
FIG. 4A is a block diagram showing in detail an exemplary configuration of the integrated electronic system mounted on the aircraft of FIG. 1.
Figure 4B:
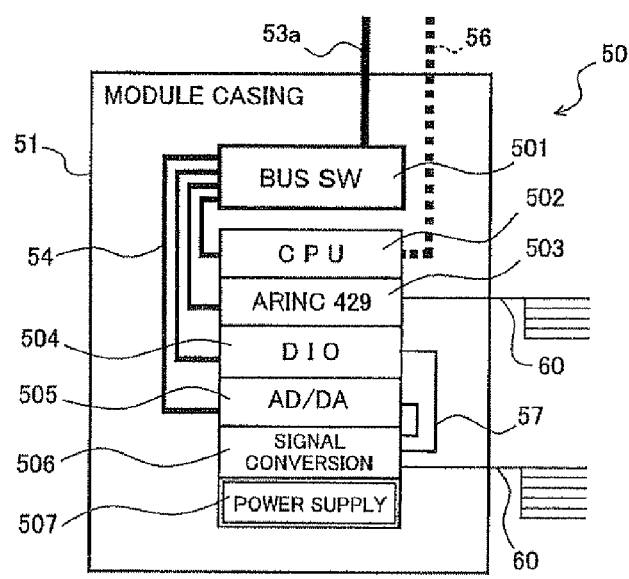
FIG. 4B is a block diagram showing an exemplary schematic configuration of the IMA unit of FIG. 4A.

Subsequently, an exemplary configuration of the IMA unit 50 for use in the present embodiment will be described specifically with reference to FIG. 3 and FIGS. 4A and 4B. FIG. 3 is a view showing a comparison between a front view and a side view schematically showing an exemplary configuration of the IMA unit 50 of FIGS. 1 and 2. FIG. 4A is a block diagram showing in detail an exemplary configuration of the integrated electronic system of FIG. 1, and FIG. 4B is a block diagram showing an exemplary configuration of the IMA unit 50 of FIG. 4A.

As shown in FIG. 3, the IMA unit 50 for use in the present embodiment includes a module casing 51 and a plurality of functional modules 55. As shown in the upper side (side view) of FIG. 3, a plurality of power supply signal connectors 52 are attached on the side surface of the module casing 51. As shown in the lower (front view) of FIG. 3, a plurality of mounting slots 500 are provided on the front surface of the module casing 51. The functional modules 55 are inserted and mounted into the mounting slots 500, respectively.

In FIG. 3, to clarify the positional relationship between the side view on the upper side and the front view on the lower side, these views are connected by dotted lines. Also, in FIG. 3, mounting slots 500 in which no functional modules 55 are mounted (empty state) are expressed as oblique line regions.

The module casing 51 is not particularly limited so long as it can accommodate the functional modules 55 in a mounted state. As the module casing 51, a casing standardized by ARINC or the like known in the fields of aircraft may be suitably used. Therefore, as the power supply signal connectors 52 and the mounting slots 500 accommodated in the module casing 51, power supply signal connectors having known specification and mounting slots having known specification can be used. In the interior of the module casing 51, as described later, in-casing data buses 54 are provided and connected to the functional modules 55 mounted therein.

In the present embodiment, the functional modules 55 include a bus switch module 501 (expressed as "bus SW" in FIG. 4B), a CPU module 502 (expressed as "CPU" in FIG. 4B), an ARINC429 module 503, a discrete I/O module 504 (expressed as "DIO" in FIG. 4B), an analog/digital conversion module 505 (expressed as "AD/DA" in FIG. 4B), a signal conversion module 506 (three kinds of signal conversion modules (A) to (C) corresponding to three kinds of signals are depicted in FIG. 4B)), and a power supply module 507.

As shown in FIGS. 4A and 4B, the bus switch module 501 is connected to the in-casing data buses 54 and connected to another functional modules 55 in the same casing via the in-casing data buses 54. The bus switch module 501 serves to perform data transfer between the functional modules 55. Further, the bus switch module 501 is connected to the integrated data bus 53 (specifically, longitudinal bus 53a) and serves to perform data transfer between the functional modules 55 in the same easing and another IMA units, i.e., functional modules 55 in another casing.

It may be said that the in-casing data buses 54 are internal buses of the IMA unit 50, while it may be said that the integrated data bus 53 is an external bus of the IMA unit 50. In the present embodiment, the same transmission protocol is set for the integrated data bus 53 and the in-casing data buses 54. Therefore, the overall integrated electronic system of the present embodiment, constructs a single network connected according to the same transmission protocol, irrespective of inside or outside of the IMA unit 50.

The bus switch module 501 serves as a gate for defining inside and outside of the IMA unit 50 and plays a more important role in construction of the network than another functional modules 55. Therefore, in FIGS. 4A and 4B and FIGS. 6A and 6B, the bus switch module 501 is indicated by a line broader than lines for representing another functional modules 55.

The CPU module 502 is configured to process digital data based on input/output signals from the terminal devices to control the control systems. In other words, the CPU module 502 has a processor function for processing data. As described above, the CPU module 502 is connected to the integrated data bus 53 (longitudinal bus 53a) via the in-casing data bus 54 and the bus switch module 501.

As shown in FIG. 4A, CPU modules 502 in the two IMA units 50a provided in the nose part 80a, are connected to each other via a CCDL 56 (Cross Channel Data Link), CPU modules 502 in the two IMA units 50b provided in the center part 80b, are connected to each other via the CCDL 56, and CPU modules 502 in the two IMA units 50c provided in the aft part 80c, are connected to each other via the CCDL 56. The CCDL 56 is provided to perform mutual data transfer relating to a redundant system and is configured to mutually input/output data independently of the network. For this reason, the CCDL 56 may use a protocol which is different from or the same as the protocol of the integrated data bus 53. Depending on a function required in the integrated electronic system, the function of the CCDL 56 may be implemented on the network and wires of the CCDL 56 may be omitted, or otherwise the function of the CCDL 56 may be omitted.

The ARINC429 module 503 is a communication module based on a specification of the ARINC429 standardized exclusively for the aircraft. The in-casing data bus 54 and the wire 60 are connected to the ARINC429 module 503. The wire 60 is connected to a terminal device which belongs to the avionics system or the utility system provided in each part of the fuselage 80 and performs communication via the ARINC429.

The discrete I/O module 504 is configured to convert an input/output signal in a discrete format converted by the signal conversion module 506 into an input/output signal in a digital format. The in-casing data bus 54 is connected to the discrete I/O module 504. In addition, an in-casing signal line 57 through which the discrete signal is input/output is connected to the discrete I/O module 504. The in-casing signal line 57 is connected to the signal conversion module 506 as described later.

The analog/digital conversion module 505 is configured to convert the analog input/output signals converted by the signal conversion module 506 into digital input/output signals. The in-casing data bus 54 is connected to the analog/digital conversion module 505, and the in-casing signal line 57 is connected to the analog/digital conversion module 505, like the discrete I/O module 504.

The signal conversion module 506 is configured to convert input/output signals in various formats, which are input/output to/from the terminal devices, into input/output signals in a standard format. The signal conversion module 506 is constituted by an analog circuit. As used herein, the analog circuit is defined in comparison with a digital circuit, and includes a circuit for converting a discrete signal in addition to a circuit for converting an analog signal.

Many of the input/output signals from the terminal devices are discrete signals or analog signals and are signals (specified format signals) having different formats depending on the kinds of the terminal devices. The signal conversion module 506 constituted by the analog circuit converts the specified format signals into the input/output signals (standard format signals) in a standard format. The discrete I/O module 504 and the analog/digital conversion module 505 convert the standard format signals into digital data in a format which can be processed by the CPU module 502. Thus, the discrete I/O module 504 and the analog/digital conversion module 505 collectively have a digital data conversion function.

Unlike the above stated functional modules 55, the signal conversion module 506 is not directly connected to the in-casing data bus 54 as shown in FIG. 4B. Instead, the signal conversion module 506 is connected to the discrete I/O module 504 and the analog/digital conversion module 505 via the in-casing signal lines 57. It can be said that the signal conversion module 506 is connected to the in-casing data bus 54 and the bus switch module 501 via the discrete I/O module 504 and the analog/digital conversion module 505. Like the ARINC429 module 503, the wire 60 is connected to the signal conversion module 506. The wire 60 is connected to the terminal device (see FIG. 2) in the utility system (see FIG. 2) provided in each part of the fuselage 80.

The power supply module 507 is configured to supply electric power to the functional modules 55 in the IMA unit 50. Therefore, the power supply module 507 is connected to the functional modules 55 via power supply wires (not shown). However, the power supply module 507 does not have a function directly relating to control of the control systems. Therefore, in the present embodiment, the power supply module 507 is not connected to the in-casing data bus 54 and to the bus switch module 501, and is not connected to the in-casing signal line 57 and to the wire 60. Note that when operating state data of the power supply module is necessary in data processing in the CPU module, the power supply module 507 may be connected to the in-casing data bus 54 and to the bus switch module 501 via the in-casing data bus 54. Or, the power supply module 507 may be connected to the in-casing signal line 57 and to the discrete I/O module 504, or the analog/digital conversion module 505, etc., via the in-casing signal line 57. In FIGS. 4A and 4B, the power supply module 507 is represented by a double frame block to express the power supply module 507 as being different from another functional modules 55.

The specific configurations of the above stated functional modules 55 are not particularly limited, but known configurations may be suitably used. At least one functional module 55 may be mounted in the IMA unit 50, but a plurality of functional modules 55 may be mounted in the IMA unit 50 as necessary or may be removed therefrom. For example, a plurality of CPU modules 502 can be mounted in the IMA unit 50 according to a load of data processing. The ARINC429 module 503, the discrete I/O module 504, and the analog/digital conversion module 505 can be mounted as necessary to correspond in number to channels, or may be omitted if input/output signals do not include the signals associated with the ARINC429 module 503, the discrete I/O module 504, and the analog/digital conversion module 505.

If there are signal formats which cannot be processed by the ARINC429 module 503, the discrete I/O module 504, and the analog/digital conversion module 505, among modules which perform signal inputting/outputting, modules for inputting/outputting signals in the signal formats are prepared and mounted in a required number.

Regarding the signal conversion module 506, various kinds of signal conversion modules 506 can be mounted in a required number according to signal formats of the terminal devices to be connected thereto. In addition, the plurality of bus switch modules 501 may be mounted to correspond in number to the channels. The power supply modules 507 may be mounted in a required number according to a required number of power supply systems or an electric power amount.

As shown in FIG. 4A, in the integrated electronic system of the present embodiment, two hub IMA units 50*d* are included in the center part 80*b*, in addition to the IMA units 50*a* to 50*c*. The hub IMA units 50*d* construct two sub-networks each including the IMA units 50*a* to 50*c* and the longitudinal bus 53*a* and connects the two sub-networks by means of the lateral bus 53*b* to construct a signal network. The hub IMA units 50*d* are each configured in such a manner that only the bus switch module 501 and the power supply module 507 are mounted in the module casing 51.

The bus switch modules 501 in the two hub IMA units 50*d* are connected to the longitudinal buses 53*a* extending from the IMA units 50*a* to 50*c* and are connected to the lateral bus 53*b* connecting the two hub IMA units 50*d*. This allows the six IMA units 50*a* to 50*c* to be connected together via the hub IMA units 50*d*. Therefore, in the integrated electronic system of the present embodiment, the hub IMA units 50*d* construct hubs which allow mutual data transfer between the IMA units 50*a* to 50*c*.

[Operation of Integrated Electronic System Mounted on Aircraft]

Figure 5:
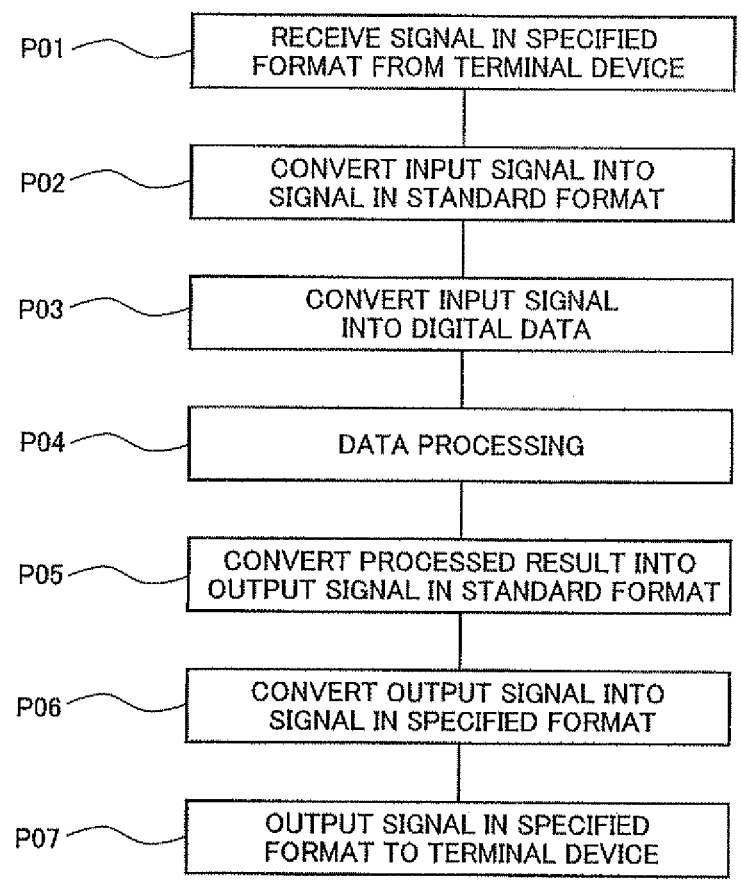
FIG. 5 is a view showing a basic control process performed in the IMA unit of FIG. 3 and FIGS. 4A and 4B.
Figure 6A:
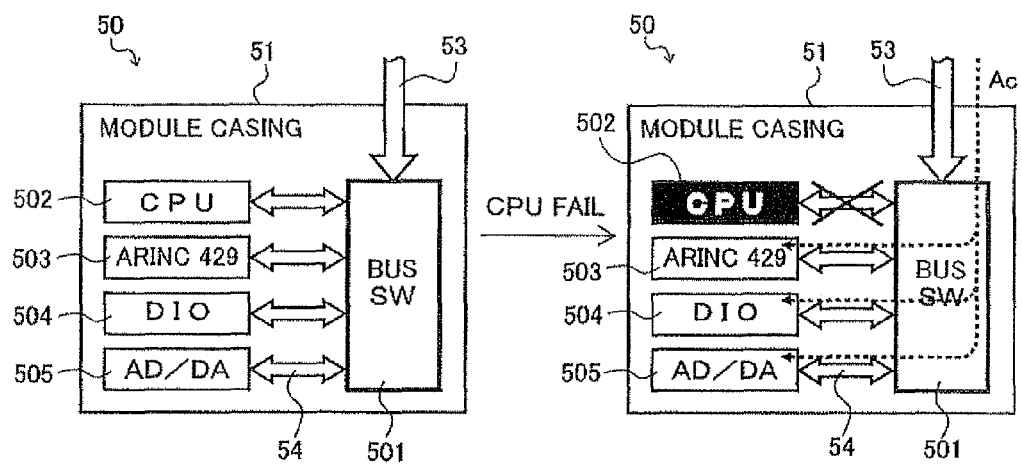
FIG. 6A is a schematic view showing a situation in which, when a CPU module of the IMA unit of FIG. 3 and FIGS. 4A and 4B, fails, another IMA unit accesses it.
Figure 6B:
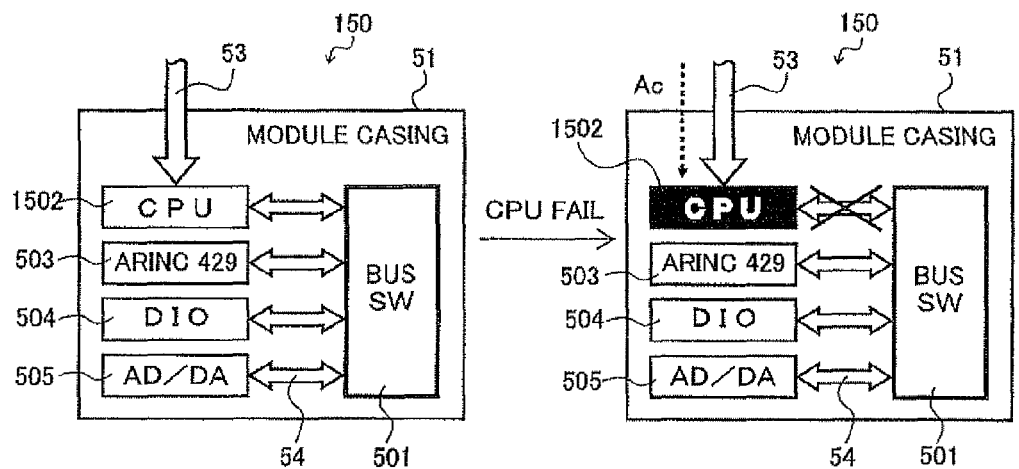
FIG. 6B is a schematic view showing a situation in which, when a failure occurs in a CPU module in an IMA unit having a comparative configuration in which an integrated data bus is connected to the CPU module.

Next, a description will be given of an exemplary operation of the integrated electronic system of the present embodiment with reference to FIG. 5 and FIGS. 6A and 6B, in addition to FIGS. 4A and 4B. FIG. 5 is a view showing a basic control process performed in the IMA unit 50 of FIG. 3 and FIGS. 4A and 4B. FIG. 6A is a schematic view showing a situation in which, when the CPU module 502 of the IMA unit 50 of FIG. 3 and FIGS. 4A and 4B, fails, another IMA unit 50 accesses it, and FIG. 6B is a schematic view showing a situation in which, when a failure occurs in a CPU module 1502 in an IMA unit 150 having a comparative configuration in which the integrated data bus 53 is connected to the CPU module 502.

Initially, the integrated electric system and allocation of controls to the IMA units 50*a* to 50*c* constituting the integrated electric system will be described. Regarding connection to the terminal devices, a pilot operation device, a nose landing gear sensor and an actuator in the landing gear system 61, a pilot operation device in the fuel system 62, a pilot operation device and a flame detection sensor in the flame detection system 63, a pilot operation device in the breed air system 64, a pilot operation device in the de-icing system 65, and others are allocated to the IMA unit 50*a* provided in the nose part 80*a*. A main landing gear sensor and an actuator in the landing gear system 61, a pump and a capacitive sensor in the fuel system 62, a flame detection sensor in the flame detection system 63, a valve, a temperature sensor, and a pressure sensor in the breed air system 64, and others are allocated to the IMA unit 50*b* provided in the center part 80*b*. A flame detection sensor in the flame detection system 63, a heater/mat in the de-icing system 65, and others are allocated to the IMA unit 50*c* provided in the aft part 80*c*. Regarding control data processing, the landing gear system 61 is allocated to the IMA unit 50*a* in the nose part 80*a*, the fuel system 62 is allocated to the IMA unit 50*b* provided in the center part 80*b*, the flame detection system 63 is allocated to the IMA unit 50*b* provided in the center part 80*b*, the breed air system 64 is allocated to the IMA unit 50*b* provided in the center part 80*b*, and the de-icing system 65 is allocated to the IMA unit 50*c* provided in the aft part 80*c*.

A basic process of the integrated electronic system will be described with reference to FIG. 5, by using as an example, the landing gear system 61 allocated to the IMA unit 50*a* and the IMA unit 50*b*.

Firstly, a pilot in the cockpit operates a landing gear extension/retraction operation lever, to extend the nose landing gear and the main landing gear. The landing gear extension/retraction operation lever corresponds to the terminal device, which outputs an operation command for extending the nose landing gear and the main landing gear as a specified format discrete signal. The specified format signal is input to the signal conversion module 506 in the IMA unit 50*a* of the nose part 80*a* from the terminal device (landing gear extension/retraction operation lever) via the wire 60 (process PO1). The signal conversion module 506 converts the input specified format signal into a standard format signal (process PO2), and the standard format signal is input to the discrete I/O module 504 via the in-easing signal line 57.

The discrete I/O module 504 converts the standard format signal in the discrete format into digital data which can be processed by the CPU module 502 (process PO3). The converted digital data is input to the CPU module 502 in the IMA unit 50*a* via the in-casing data bus 54 and the bus switch module 501. The CPU module 502 processes the input digital data (operation command data) based on a predetermined program and generates operation execution data for extending the nose landing gear and the main landing gear (process PO4).

Of the operation execution data (processed result), data relating to the nose landing gear is output to the discrete I/O module 504 in the IMA unit 50*a* via the in-casing data bus 54 and the bus switch module 501 in the IMA unit 50*a*, and converted into the standard format discrete signal (process PO5). The standard format discrete signal is output to the signal conversion module 506 via the in-casing signal line 57.

By comparison, operation execution data relating to the main landing gear is transferred to the IMA unit 50*b* provided in the center part 80*b*, via the bus switch module 501 and the integrated data bus 53. In the IMA unit 50*b*, the operation execution data is output to the discrete I/O module 504 in the IMA unit 50*b* via the bus switch module 501 and the in-casing data bus 54. The discrete I/O module 504 coverts the operation execution data into the standard format discrete signal (process PO5). The standard format discrete signal is output to the signal conversion module 506 via the in-casing signal line 57 in the IMA unit 50*b*.

After that, the signal conversion module 506 in the IMA unit 50*a* convers the standard format discrete signal into a specified format output signal suitable for an actuator 412 of the nose landing gear (process PO6). The specified format signal is output to the terminal device via the wire 60 (process PO7). The signal conversion module 506 in the IMA unit 50*b* convers the standard format discrete signal into a specified format output signal suitable for the actuator 412 of the main landing gear (process PO6). The specified format signal is output to the terminal device via the wire 60 (process PO7).

A signal of the nose landing gear position sensor 411 and a signal of the main landing gear position sensor 411 travel through paths opposite to the paths of the operation execution data for the actuators 412, and are input to the CPU module 502 in the IMA unit 50*a*. The signals are input to the CPU modules 502 in the IMA unit 50*a* and are used as control data.

In the IMA units 50*a* to 50*c* provided in the nose part 80*a*, the center part 80*b* and the aft part 80*c*, in a case where a particular function is provided over a plurality of parts, the input/output signal from the terminal device in each part is input/output to/from the IMA unit 50 provided in that part, and is transmitted/received to/in the IMA unit 50 which performs data processing via the integrated data bus 53. Since the integrated data bus 53 which is an external bus of the IMA unit 50 and the in-casing data bus 54 which is an internal bus in the IMA unit 50 use the same transmission protocol. Therefore, the overall integrated electronic system of the present embodiment, constructs a single network irrespective of inside or outside of the IMA unit 50. This allows smooth data transfer between the IMA units 50 in different parts, which controls the overall system efficiently.

Since the input/output signals of the terminal devices are different depending on the kinds of the terminal devices, the signals input/output to/from the IMA units 50*a* to 50*c* via the wires 60 contain signals having various formats. By comparison, in the present embodiment, the IMA units 50*a* to 50*c* include signal conversion modules 506 for converting the input/output signals having various formats into standard format signals. Therefore, a difference between signal formats is "absorbed" by the signal conversion module 506.

In the field of IMA, it is known that programs are required to be implemented in processor modules and input/output modules which perform digital data processing, and therefore development cots is very high. However, in the present embodiment, since the difference between the input/output signals is "absorbed" by the signal conversion module 506 as described above, standard CPU modules 502 can be mounted into the IMA units 50*a* to 50*c* as the processor modules, and standard discrete I/O modules 504 and standard analog/digital conversion modules 505 can be mounted into the IMA units 50*a* to 50*c* as the input/output modules. This eliminates a need for development of new data processing modules and input/output modules for various fuselages. Since the signal conversion modules 506 are constituted by analog circuits, it is not necessary to incorporate programs for digital data processing. As a result, development cost can be reduced.

As shown in FIG. 4A (and FIG. 1), the two IMA units 50*a* are provided in the nose part 80*a*, the two IMA units 50*b* are provided in the center part 80*b*, and the two IMA units 50*c* are provided in the aft part 80*c*. The nose part 80*a*, the center part 80*b* and the aft part 80*c* are assumed as requisite minimum number. Because of this, the number of the IMA units 50 is not excess, and the double redundant system can be constructed in each part. In the overall integrated electronic system, a multiple redundant system can be constructed. As a result, reliability and fault tolerance of the integrated electronic system can be improved.

Even when data transfer is performed between different IMA units 50 via the integrated data bus 53, as described above, the integrated electronic system of the present embodiment can further improve reliability of the overall system, and implement higher fault tolerance. This will be described with reference to FIGS. 6A and 6B.

In general, in the field of the IMA, different transmission protocols are set for the internal bus and the external bus of the IMA unit, and it is necessary to perform data transfer processing between inside and outside of the IMA unit. In most cases, the integrated data bus 53 is connected to the CPU module and the CPU module performs data transfer processing. The configuration of the IMA unit in this case is shown in FIG. 6B, in which a comparative IMA unit is identified by 150 and a comparative CPU module is identified by 1502.

In the present embodiment, as described above, since the same transmission protocol is set for the integrated data bus 53 and the in-casing data bus 54, the same network can be constructed, irrespective of inside or outside of the IMA unit 50. Therefore, the integrated data bus 53 (external bus) and the in-casing data bus 54 (internal bus) can be directly connected together without via the CPU module 502. Thus, as shown in FIGS. 4A and 4B and FIG. 6A, in the IMA unit 50 of the present embodiment, the integrated data bus 53 is connected to the bus switch module 501 instead of the CPU module 502.

In accordance with this configuration, as shown at the left side in FIG. 6A, the CPU module 502, the ARINC429 module 503, the discrete I/O module 504, and the analog/digital conversion module 505 are connected in parallel to the bus switch module 501 via the in-casing data buses 54, respectively. In this configuration, the bus switch module 501 serves as a hub for performing data transfer of the respective functional modules 55 inside the IMA unit 50, and as a gate for performing data transfer between the integrated data bus 53 and the in-casing data buses 54.

As shown at the right side in FIG. 6A, even if the CPU module 502 fails, another IMA unit 50 can access the ARINC429 module 503, the discrete I/O module 504, and the analog/digital conversion module 505, as indicated by a dotted-line arrow Ac in FIG. 6A. Therefore, even the IMA unit 50 in which the CPU module 502 has failed, signal inputting/ outputting with the terminal devices is enabled. Thus, it is possible to prevent the control system from failing to function.

By comparison, in the configuration of the comparative IMA unit 150, as shown at the left side in FIG. 6B, the integrated data bus 53 is connected to the CPU module 1502. In this case, the CPU module 1502 operates as a gate of the comparative IMA unit 150. On the other hand, the CPU module 1502, and another functional modules 55 (the ARINC429 module 503, the discrete I/O module 504, and the analog/digital conversion module 505) are connected in parallel to the bus switch module 501 via the in-casing data buses 54. Therefore, the bus switch module 501 operates as a hub.

In such a configuration, as shown at the right side in FIG. 6B, if the CPU module 1502 in the comparative IMA unit 150 fails, a gate (CPU module 1502) of the comparative IMA unit 150 is inoperative even if another comparative IMA unit 150 tries to access the comparative IMA unit 150 as indicated by a dotted-line arrow Ac in FIG. 6B. Therefore, the comparative IMA unit 150 is unable to be accessed even if no problem exists in the hub (bus switch module 501) and another functional modules 55.

As should be appreciated from the above, in accordance with the integrated electronic system of the present embodiment, since the integrated data bus 53 is directly connected to the in-casing data buses 54, if the CPU module 502 in a particular IMA unit 50 fails, the CPU module 502 in another IMA unit 50 can access input/output modules (in the present embodiment, the ARINC429 module 503, the discrete I/O module 504, and the analog/digital conversion module 505) in the particular IMA unit 50. Therefore, input/output operation with the terminal device can be maintained. In addition, in accordance with this configuration, all CPU modules 502 can access all input/output modules. Therefore, by designing each CPU so that it has an allowance for a load, by stopping processing with a lower priority, etc., the operation of the CPU module 502 in a failure state can be performed by another CPU module 502. This can further improve fault tolerance in the integrated electronic system.

Moreover, in accordance with the configuration of the integrated electronic system of the present embodiment, the CPU module 502 need not perform data transfer processing between the integrated data bus 53 and the in-casing data buses 54. Because of this, advantageously, it becomes unnecessary to allocate a data processing ability of the CPU module 502 to the data transfer processing.

In the comparative IMA unit 150 in FIG. 6B, the in-casing buses are implemented by using the bus switch module 501. In a general configuration of the IMA, in most cases, the in-casing buses are implemented by electric wire connection, and bus control is performed by the CPU module 1502. As shown in FIG. 6B, for easier explanation, the bus switch module 501 is shown for easier comparison with the IMA unit 50 of FIG. 6A. However, it is needless to say that the in-casing buses may be the electric wire connection. In the case of the in-casing buses in the electric wire connection, the above described advantages of the integrated electronic system of the present invention cannot be impaired.

[Modified Example]

Although in the present embodiment, the two IMA units 50a are provided in the nose part 80a, the two IMA units 50b are provided in the center part 80b, and the two IMA units 50c are provided in the aft part 80e, the present invention is not limited to this configuration. For example, if single redundant systems are allowed, one IMA unit (three IMA units in total) may be provided in each of the parts. If triple redundant systems are required, three IMA units (nine IMA units in total) may be provided in each of the parts. The number of IMA units 50 provided in each of the parts may be suitably set to construct a redundant form based on reliability demanded in the integrated electronic system.

For example, four IMA units 50b may be provided only in the center part 80b, the two IMA units 50a may be provided in the nose part 80a, and the two IMA units 50c may be provided in the aft part 80c. Thus, the IMA units 50 need not be set with an equal number in the respective parts, but may be set with different numbers, because of a reason for a layout space of the IMA units 50 in the fuselage 80.

Although in the present embodiment, two hub IMA units 50d are provided to serve as hubs between the IMA units 50 as shown in FIG. 4A, the hub IMA units 50d are not necessarily provided. For example, the bus switch module 501 of the IMA unit 50b provided in the center part 80b may be operative as the hub between the IMA units 50 as well as the hub inside the IMA unit 50, and the entire longitudinal bus 53a and the lateral bus 53b may be connected to the bus switch module 501 in the IMA unit 50b. Although in the present embodiment, the lateral bus 53b is provided in the center part 80b, its location is not particularly limited. The lateral bus 53b may be provided in the center part 80b, the nose part 80a, or the aft part 80c. Or, the lateral bus 53b may be provided in two locations or three locations instead of one location.

Although the present embodiment is intended for integration of only the utility systems of the integrated electronic system, the avionics systems may also be integrated. Or, among the utility systems, only control systems effective in integration may be integrated, or a plurality of systems each including integration of several control systems may be provided.

Although in the present embodiment, three kinds of input/output modules, i.e., the ARINC429 module 503, the discrete I/O module 504, and the analog/digital conversion module 505 are illustrated, the input/output modules are not limited to these. For example, as necessary, a pulse counter module, an RS-422 serial communication module, and others may be used.

Although FIG. 3 shows the modules as having similar forms, the bus switch module 501 and the power supply module 507 may have different forms from another modules, because the bus switch module 501 and the power supply module 507 are closely linked with the module casing 51. For example, the bus switch module 501 and the power supply module 507 may be configured as a part of the module casing 51.

Although in the integrated electronic system of the present embodiment, the same transmission protocol is used for the integrated data bus 53 and the in-casing data buses 54, different protocols may be used for the purpose of higher efficiency or reliability of the overall control. In this case, it is important to connect the integrated data bus 53 to the bus switch module 501 instead of the CPU module 502. For example, there may be a configuration in which the integrated data bus 53 and the in-casing data bus 54 are connected to the bus switch module 501, the bus switch module 501 is allowed to have a data conversion function between the buses, or another protocol bus connection module may be provided like the ARINC429 module 503, by connecting the integrated data bus 53 of another protocol to the bus switch module 501 via the bus connection module. With these configuration, the advantage of the present embodiment can be achieved.

The present invention is not limited to the above embodiments, but may be changed in various ways within a scope of the claims. An embodiment obtained by suitably combining technical means disclosed in different embodiments or plural modified examples may be included in a technical scope of the present invention.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

The present invention is widely used in fields of integration of control system in aircrafts. Particularly, the present invention is suitably applicable to fields of integration of utility systems in small-sized aircraft such as a regional jet.

The invention claimed is:

1. An integrated electronic system mounted on an aircraft which integrates at least control systems of functions of a fuselage, among a plurality of control systems mounted on the aircraft, the integrated electronic system mounted on the aircraft comprising an integrated modular avionics unit;
the integrated modular avionics unit including:
a plurality of functional modules;
a module casing for accommodating the plurality of functional modules in a mounted state; and
in-casing data buses connected to the plurality of functional modules accommodated in the module casing;
wherein the plurality of functional modules include a bus switch module connected to the functional modules via the in-casing data buses, respectively, to enable data transfer between the functional modules, the bus switch module being connected to an integrated data bus in the integrated electronic system mounted on the aircraft, directly or via an integrated data bus connection module, to enable data transfer between the functional modules and the integrated data bus,
wherein an identical transmission protocol is set for the integrated data bus and the in-casing data buses.

2. An integrated electronic system mounted on an aircraft which integrates at least control systems of functions of a fuselage, among a plurality of control systems mounted on the aircraft, the integrated electronic system mounted on the aircraft comprising an integrated modular avionics unit;
the integrated modular avionics unit including:
a plurality of functional modules;
a module casing for accommodating the plurality of functional modules in a mounted state; and
in-casing data buses connected to the plurality of functional modules accommodated in the module casing;
wherein the plurality of functional modules include a bus switch module connected to the functional modules via the in-casing data buses respectively, to enable data transfer between the functional modules, the bus switch module being connected to an integrated data bus in the integrated electronic system mounted on the aircraft, directly or via an integrated data bus connection module, to enable data transfer between the functional modules and the integrated data bus,
wherein the plurality of functional modules in the integrated modular avionics unit include:
a processor module for performing processing to control the control systems;
a signal conversion module for converting input/output signals input/output to/from terminal devices in the control systems into processed signals in a predetermined format; and
a digital data conversion module for performing mutual conversion between the processed signals converted by the signal conversion module and digital data which can be processed by the processor module;
wherein the signal conversion module is constituted by an analog circuit and is connected to the in-casing data bus in the integrated modular avionics unit via the digital data conversion module.

3. The integrated electronic system mounted on the aircraft according to claim 2,
wherein the functional modules include an aircraft communication module standardized exclusively for the aircraft.

4. An integrated electronic system mounted on an aircraft which integrates at least control systems of functions of a fuselage, among a plurality of control systems mounted on the aircraft, comprising:
integrated modular avionics units provided in a nose part, a center part, and an aft part of the fuselage of the aircraft, respectively; and
an integrated data bus for mutually connecting the integrated modular avionics units,
wherein functional modules in each of the integrated modular avionics units include:
a processor module for performing processing to control the control systems;
a signal conversion module for converting input/output signals input/output to/from terminal devices in the controls systems into processed signals in a predetermined format; and
a digital data conversion module for performing mutual conversion between the processed signals converted by the signal conversion module and digital data which can be processed by the processor module;
wherein the signal conversion module is constituted by an analog circuit and is connected to an in-casing data bus in the integrated modular avionics unit via the digital data conversion module.

5. The integrated electronic system mounted on the aircraft according to claim 4,
wherein the integrated modular avionics units are configured such that two or more integrated modular avionics units are provided in each of the nose part, the center part, and the aft part of the fuselage.

6. The integrated electronic system mounted on the aircraft according to claim 4,
wherein the functional modules include an aircraft communication module standardized exclusively for the aircraft.

* * * * *